(12) United States Patent
Limoges et al.

(10) Patent No.: US 7,289,978 B2
(45) Date of Patent: Oct. 30, 2007

(54) SUBSTITUTING PARAMETER MARKERS FOR LITERALS IN DATABASE QUERY LANGUAGE STATEMENT TO PROMOTE REUSE OF PREVIOUSLY GENERATED ACCESS PLANS

(75) Inventors: Joseph Serge Limoges, Etobicoke (CA); Robert A. Begg, Scarborough (CA); Dominique J. Evans, Toronto (CA); William T. O'Connell, Etobicoke (CA); Klaus Bernhard Schiefer, Pickering (CA); Timothy J. Vincent, Toronto (CA)

(73) Assignee: International Business Machines Coporation, Armonk, NY (US)

( * ) Notice: Subject to any disclaimer, the term of this patent is extended or adjusted under 35 U.S.C. 154(b) by 697 days.

(21) Appl. No.: 10/389,315

(22) Filed: Mar. 13, 2003

(65) Prior Publication Data

US 2003/0200204 A1 Oct. 23, 2003

(30) Foreign Application Priority Data

Apr. 19, 2002 (CA) .................................. 2382714

(51) Int. Cl.
*G06F 17/30* (2006.01)
(52) U.S. Cl. .......................................... 707/2; 709/219
(58) Field of Classification Search ................ 707/2–5, 707/6; 709/203, 219
See application file for complete search history.

(56) References Cited

U.S. PATENT DOCUMENTS

| 5,257,366 A | 10/1993 | Adair et al. |
|---|---|---|
| 5,596,748 A | 1/1997 | Kleewein et al. |
| 5,640,555 A | 6/1997 | Kleewein et al. |
| 5,649,168 A | 7/1997 | Huang et al. |
| 5,706,499 A | 1/1998 | Kleewein et al. |
| 5,764,949 A | 6/1998 | Huang et al. |
| 5,768,577 A | 6/1998 | Kleewein et al. |
| 5,930,793 A | 7/1999 | Kleewein et al. |
| 5,943,671 A | 8/1999 | Kleewein et al. |
| 5,950,188 A * | 9/1999 | Wildermuth .................... 707/3 |

(Continued)

FOREIGN PATENT DOCUMENTS

CA 2283052 * 9/1999

OTHER PUBLICATIONS

Post SQL (Postgre SQL 7.1 User's Guide, 2001 by Postgre SQL Global Development Group, hereafter "Post SQL").*

*Primary Examiner*—Leslie Wong
(74) *Attorney, Agent, or Firm*—Sawyer Law Group LLP (57) ABSTRACT

A method, computer program product and computing device for promoting reuse of previously generated access plans are disclosed. SQL statements containing literals are amended so as to substitute a parameter marker for each literal. Amended statements are provided to the DBMS along with parameters including the substituted literals and a substitution indicator indicating that the substitution has been performed. The DBMS assesses the soundness of the substitutions that are performed. Soundness may be measured in terms of the semantic correctness of the amended statement and the likelihood that the literal substitution will improve DBMS efficiency. If a substitution is unsound, the DBMS may obtain and optimize the original version of the amended SQL statement. Otherwise, the amended statement is optimized. Advantageously, SQL statements originally differing only in the value of one or more literals may become functionally equivalent, and the reuse of cached, previously generated access plans is thus promoted.

5 Claims, 4 Drawing Sheets

U.S. PATENT DOCUMENTS

| | | |
|---|---|---|
| 5,987,465 A | 11/1999 | Kleewein et al. |
| 5,995,957 A | 11/1999 | Beavin et al. |
| 6,199,047 B1 * | 3/2001 | Dimino et al. ............... 705/10 |
| 6,272,487 B1 | 8/2001 | Beavin et al. |
| 6,356,887 B1 * | 3/2002 | Berenson et al. ............. 707/2 |
| 6,556,990 B1 * | 4/2003 | Lane .............................. 707/6 |
| 6,567,803 B1 * | 5/2003 | Ramasamy et al. ............ 707/4 |
| 6,598,038 B1 * | 7/2003 | Guay et al. .................... 707/2 |
| 6,985,904 B1 * | 1/2006 | Kaluskar et al. ............ 707/101 |

* cited by examiner

SUBSTITUTING PARAMETER MARKERS FOR LITERALS IN DATABASE QUERY LANGUAGE STATEMENT TO PROMOTE REUSE OF PREVIOUSLY GENERATED ACCESS PLANS

CROSS-REFERENCE TO RELATED APPLICATION

The present application claims priority under 35 U.S.C. § 119(a) of Canadian Patent Application Serial No. 2,382,714 filed Apr. 19, 2002.

FIELD OF THE INVENTION

The present invention relates to the field of database management systems (DBMSs), and more particularly to DBMSs which utilize a database query language statement cache.

BACKGROUND OF THE INVENTION

A database management system (DBMS) is a computer program which stores, retrieves, and deletes data from a database in response to user requests. Requests for information from a database are made in the form of a query (also referred to as a "statement" or "command"), which is a stylized question. A DBMS may process requests from locally executed applications or from one or more remote clients by way of a data network. From a technical standpoint, DBMSs can differ widely. The terms relational, network, flat, and hierarchical all refer to the way a DBMS organizes information internally. The internal organization can affect how quickly and flexibly information can be extracted from a database.

A relational database management system (RDBMS) is a particular type of DBMS that operates on a relational database. An RDBMS stores data in the form of related tables. RDBMSs are powerful because they require few assumptions about how data is related or how data will be extracted from the relational database. As a result, the same database can be viewed in many different ways. An important feature of relational systems is that a single database can be spread across several tables. This differs from flat-file databases, in which each database is self-contained in a single table. Almost all full-scale database systems are RDBMSs. Small database systems, however, use other designs that provide less flexibility in posing queries.

DBMS queries may be written in various database query languages. For example, a well known database query language that is supported by a wide variety of leading DBMS products, such as DB2® from IBM® and Microsoft® Access, for example, is Structured Query Language (SQL). SQL is typically used in association with relational DBMSs. SQL comprises two primary components, namely, a Data Definition Language (DDL) and a Data Manipulation Language (DML). The DDL comprises statements for creating database tables and for creating indices which facilitate access to those tables, for example. The DML, on the other hand, comprises statements for creating, inserting, selecting and deleting rows in tables. In the case of SQL, the present description focuses on the DML.

Most DBMSs have a statement cache that is used to optimize the processing of database query language statements (which, in the case of SQL, make up the DML). As known by those skilled in the art, a statement cache stores the N most recently executed database query language statements and the N "access plans" corresponding to these statements (where N is an integer). An access plan describes the operations that must be performed by the DBMS to effect a particular statement (e.g. open file X; scan the file for search pattern Y, etc.) and may be proprietary. A query optimizer (or simply "optimizer") reads a new database query language statement and subsequently generates an access plan for that statement. Both the statement and its corresponding access plan are then stored in the statement cache. Typically, the query optimizer is implemented as a software module which is operationally integrated with the DBMS. In the case of an SQL-compatible DBMS (i.e. a DBMS capable of processing SQL statements), the statement cache may be referred to as an "SQL statement cache".

During database query language statement optimization, incoming statements are typically compared to previously received statements stored in the statement cache. When an incoming statement is determined to be functionally equivalent to a stored statement, the DBMS may load and execute the previously-computed access plan associated with the stored statement rather than computing an access plan afresh. This reuse of access plans tends to improve DBMS efficiency because the amount of processing that is required to identify and load an existing access plan is typically significantly less than the processing required to compute an access plan afresh.

To determine whether an incoming database query language statement is functionally equivalent to a stored statement, known DBMSs typically perform a textual comparison. That is, a new statement is only considered to be functionally equivalent to a previously received statement if it is textually identical to that statement (disregarding insignificant differences such as different spacing). Accordingly, when an incoming database query language statement differs from a previous statement by even one significant character, it will be assumed that the new statement is not functionally equivalent to the previous statement, and a fresh access plan will be computed. Potential efficiency gains may go unrealized as a result.

One situation in which this problem arises is in the processing of database query language statements containing literals. A literal is a hard coded value, such as "abc" or 8.0, in a statement (in the case of SQL, these are referred to as SQL literals). If a new database query language statement differing from a previous statement only in the value of one or more literals is received, the cached access plan associated with the previous statement will not be reused despite the fact that it may be functionally similar to the access plan that will be computed anew. Disadvantageously, potential DBMS efficiency gains may not be realized in this situation.

Accordingly, a solution that addresses, at least in part, these and other shortcomings is desirable.

SUMMARY OF THE INVENTION

An object of the present invention is to promote reuse of previously generated access plans (which are typically stored in a database query language statement cache) if the difference between a newly received database query language statement and a previously received database query language statement is the value of one or more literals.

A method, computer program product and computing device for promoting reuse of previously generated access plans in a DBMS are disclosed. Database query language statements containing literals are amended so as to substitute a parameter marker for each literal. Amended statements are provided to the DBMS. Parameters comprising the substituted literals and a substitution indicator indicating that the substitution has been performed are typically also provided to the DBMS. The DBMS may assess the soundness of the substitutions that are performed. Soundness may be measured in terms of the semantic correctness of the amended statement and the likelihood that the literal substitution will improve DBMS efficiency. If a substitution is unsound, the DBMS may obtain and optimize (i.e. select an access plan for) the original version of the amended database query language statement. Otherwise, the amended statement is optimized. Advantageously, database query language statements originally differing only in the value of one or more literals may become functionally equivalent, and the reuse of cached, previously generated access plans is thus promoted. Improvements in DBMS efficiency may thus be achieved.

In a typical application, the DBMS is a relational DBMS, and the database query language is Structured Query Language (SQL). This is not required however.

In accordance with an aspect of the present invention there is provided a method for promoting reuse of previously generated access plans by a DBMS. The method includes generating an amended database query language statement with a parameter marker substituted for a literal.

In accordance with another aspect of the present invention, there is provided a method for promoting the reuse of previously generated access plans by a DBMS. The method includes receiving an amended database query language statement with a parameter marker substituted for a literal.

In accordance with still another aspect of the present invention, there is provided a computing device for promoting reuse of previously generated access plans by a DBMS. The device includes a processor and persistent storage memory in communication with the processor storing processor readable instructions adapting the device to generate an amended database query language statement with a parameter marker substituted for a literal.

In accordance with yet another aspect of the present invention, there is provided a computing device for promoting reuse of previously generated access plans by a DBMS. The device includes a processor and persistent storage memory in communication with the processor storing processor readable instructions adapting the device to receive an amended database query language statement with a parameter marker substituted for a literal.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In the figures which illustrate an example embodiment of this invention.

DETAILED DESCRIPTION

Figure 1:
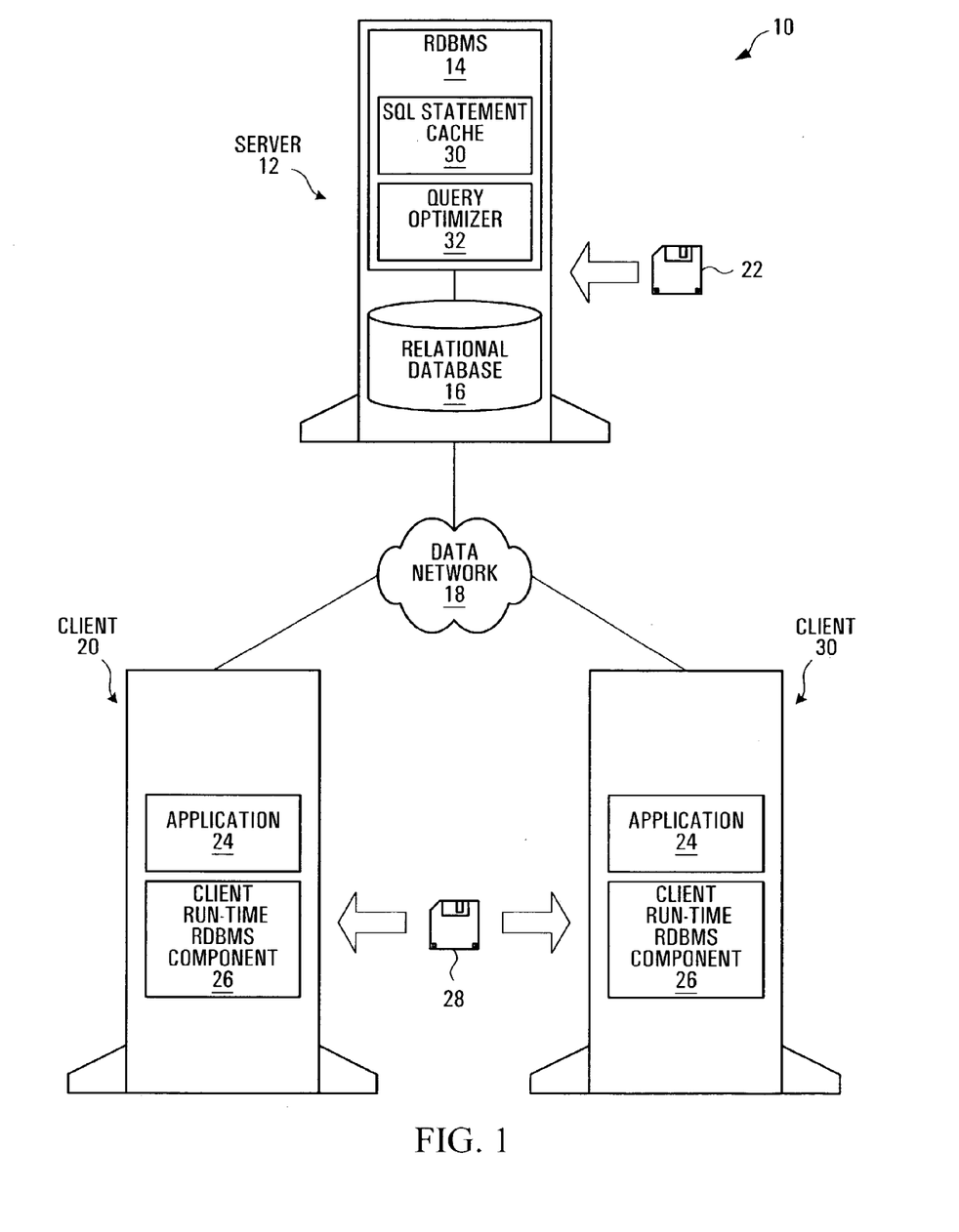
FIG. 1 illustrates a data processing system including a database management system (DBMS) for promoting reuse of previously computed access plans according to embodiments of the present invention.

FIG. 1 illustrates a data processing system 10 exemplary of the present invention. Data processing system 10 includes a server 12 in communication with client computing devices 20 and 30 over a data network 18.

The server 12 is a conventional network capable server computing device including: a processor; memory; a network interface such as a modem or Ethernet connection interface; a user input device such as a keyboard and/or mouse; and a display device such as a CRT or liquid crystal display (all not shown). The server 12 hosts an RDBMS 14 which facilitates access to a relational database 16. The RDBMS 14 is SQL compatible (i.e. capable of processing SQL statements). The RDBMS 14 and relational database 16 may be stored in any suitable combination of volatile and non-volatile memory, and may be loaded from a computer program product having a readable medium, such as a removable optical or magnetic disk 22. It can be appreciated that the invention can be adapted for use with any type of DBMS.

The RDBMS 14 may be a conventional RDBMS which has been configured or modified to implement the embodiments of the present invention in the manner described below. The RDBMS 14 includes a SQL statement cache 30 and query optimizer 32. The SQL statement cache 30 stores the N most recently executed SQL statements along with the N associated access plans. The query optimizer 32 optimizes the processing of incoming SQL queries by the RDBMS 14. For each new (i.e. not previously received) SQL statement, the query optimizer 32 computes an access plan for that statement and causes both the statement and the access plan to be stored in the statement cache 30. The optimizer 32 also compares each incoming statement to previously received statements stored in the cache 30 and, if the incoming SQL statement is identical to a stored SQL statement, the optimizer 32 directs the RDBMS 14 to load and execute the previously-computed access plan associated with that stored statement (rather than computing an access plan afresh). It will be appreciated that components other than the cache 30 and optimizer 32 may be included with the RDBMS 14.

Client computing devices 20 and 30 are conventional network aware computers, each including: a processor; memory; a network interface; a user input device; and a display (all not shown). Client devices 20 and 30 host a client application 24 and a client run-time RDBMS component 26. The client application 24 and client run-time RDBMS component 26 are stored in any suitable combination of volatile and non-volatile memory of client devices 20, 30, and may be loaded from a computer program product having a readable medium, such as a removable optical or magnetic disk 28.

The client application 24 is a software application which requires access to data stored in relational database 16, such as a travel agent's airline ticket reservation client-side application for example. The client application 24 includes API calls which are made for the purpose of accessing or manipulating data stored in the relational database 16.

The client run-time RDBMS component 26 implements the API calls made from within the client application 24 to cause the desired data to be accessed or manipulated by communicating with the RDBMS 14 of server 12. In the present configuration, this communication is by way of a data network 18 using an operative client/server protocol. The client run-time RDBMS component 26 effectively abstracts (i.e. makes transparent) the presence of the data network 18 to the client application 24. The client RDBMS run-time component 26 may be a conventional RDBMS run-time client component, such as the DB2 run-time client (DB2RTC) for example, which has been configured or modified to implement the present invention as described herein.

The data network 18 interconnecting RDBMS 14 and client computing devices 20 and 30 may for example be a local area network (LAN); a private intranet; the Internet; or other types of data networks known to those skilled in the art. The data network 18 supports an operative client/server protocol used by the system 10 for intercommunication between the server 12 and client devices 20 and 30.

Figure 2:
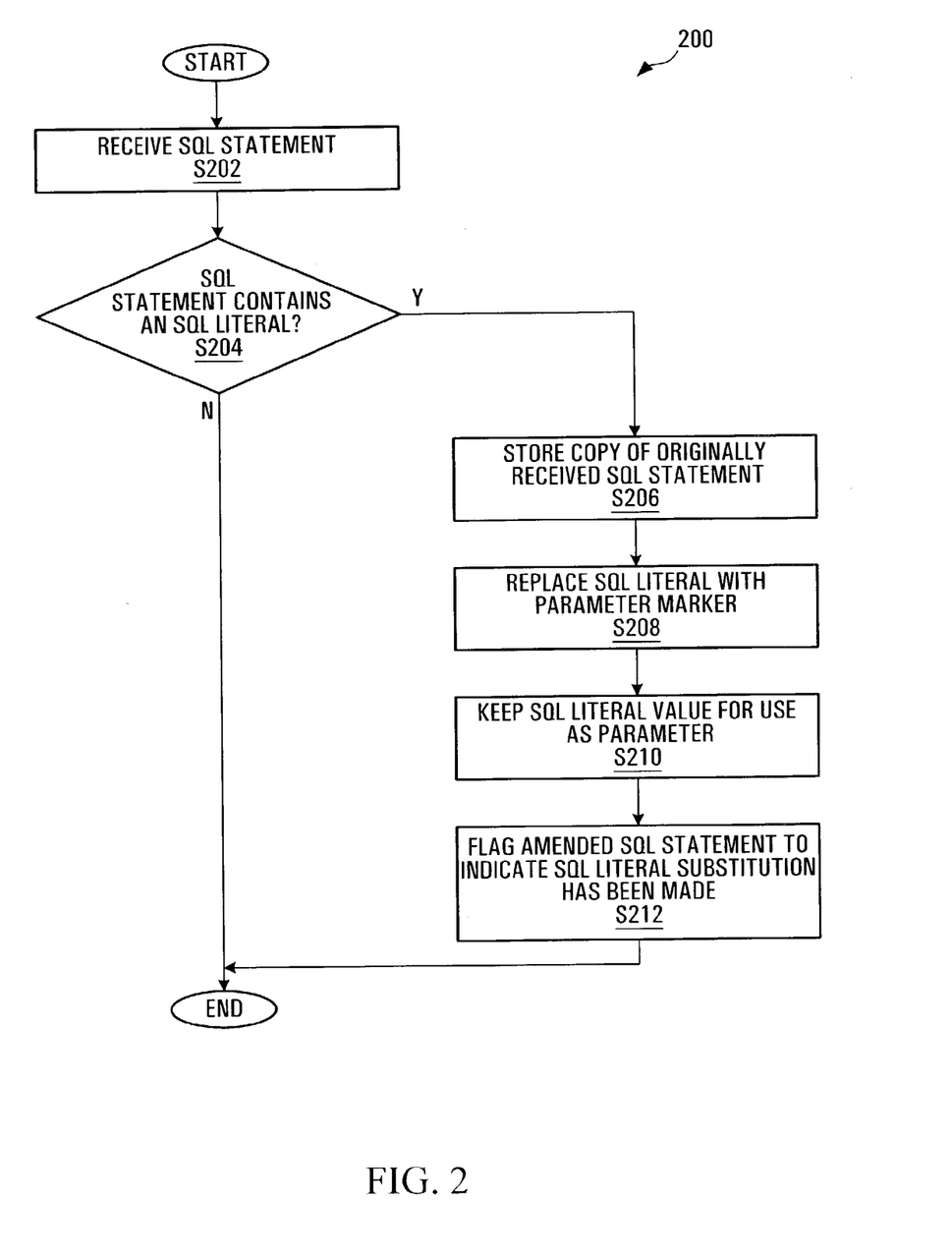
FIG. 2 shows operation for pre-processing an SQL statement performed by the data processing system of FIG. 1.
Figure 3:
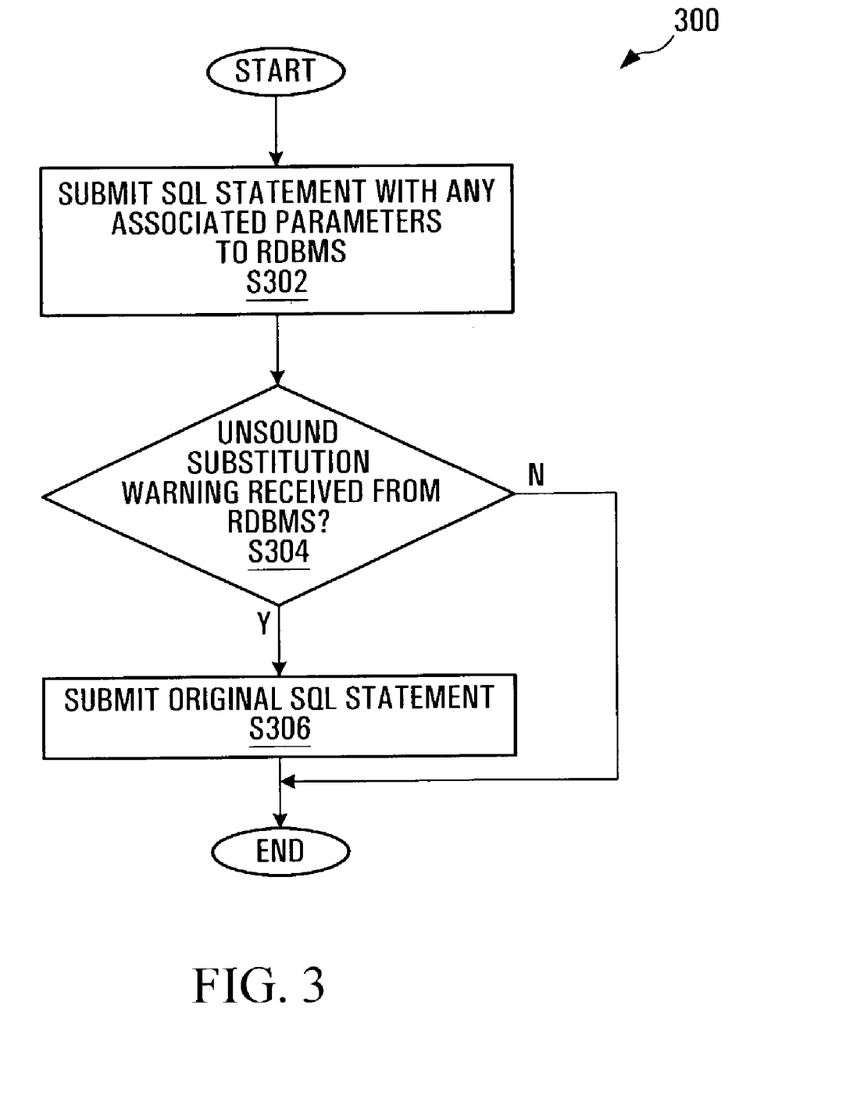
FIG. 3 shows operation for execution of the pre-processed SQL statement performed by the data processing system of FIG. 1.
Figure 4:
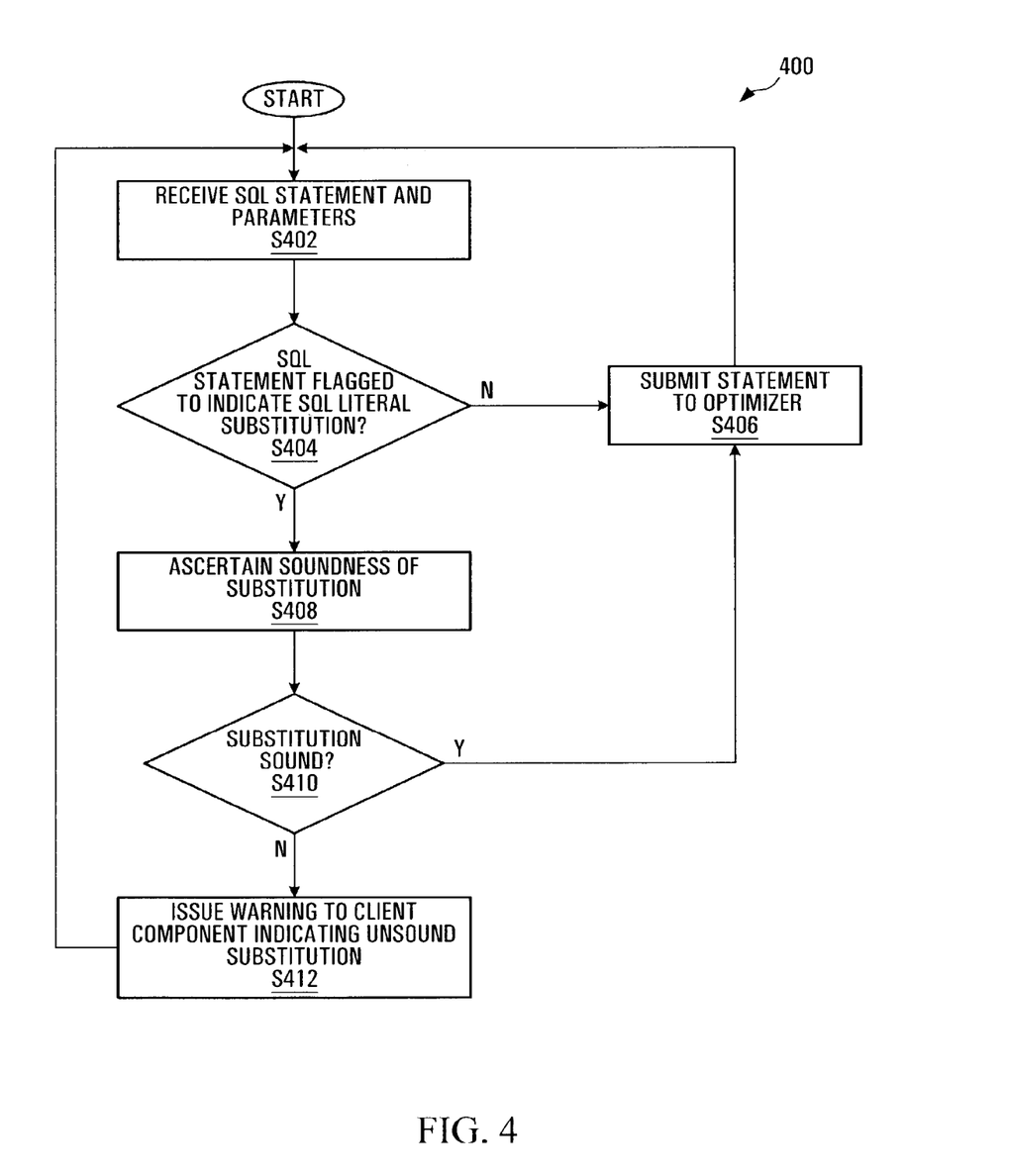
FIG. 4 shows operation for execution of an SQL statement performed by the data processing system of FIG. 1.

The operation of the present embodiment is illustrated in FIGS. 2 to 4, with additional reference to FIG. 1. FIGS. 2 and 3 represent processing which occurs at client computing device 20 or 30 (FIG. 1) of the present embodiment while FIG. 4 represents processing which occurs at the server 12. Alternatively, it will be appreciated that operations depicted in FIG. 2 and FIG. 3 can be performed by server 12 of FIG. 1. In particular, FIG. 2 shows a flowchart of steps 200 representative of the pre-processing of an SQL statement by the client run-time RDBMS component 26; FIG. 3 shows a flowchart of steps 300 representative of the execution of a pre-processed SQL statement by the client run-time RDBMS component 26; and FIG. 4 shows a flowchart of steps 400 representative of the execution of an SQL statement by the RDBMS 14. It will be appreciated that the steps 200, 300 and 400 are all executed at run time for each SQL statement in a client application 24, and that steps 300 and 400 are executed substantially in lockstep.

Beginning with FIG. 2, in initial step S202 an SQL statement to be executed is received at the client run-time RDBMS component 26 as a result of the invocation of an appropriate API call from within client application 24. An exemplary received SQL statement is as follows:

SELECT NAME FROM EMPLOYEES WHERE
  JOB_LEVEL="ENGINEER" AND SAL-
  ARY>100000.0 AND YEARS_OF_SERVICE>5     (1)

This SQL statement represents a search within an employees table of the relational database 16 for the names of engineers earning more than $100,000.00 and having more than five years of service.

In subsequent step S204, the client run-time RDBMS component 26 examines received SQL statement for the presence of an SQL literal. In the event that no SQL literal is found, the flowchart of steps 200 for this particular statement will be completed (that is, operation ends). In the present case however, three literals are found: "ENGINEER", 100000.0, and 5. Accordingly, steps S206 to S212 are executed for the purpose of converting the hard-coded literal values into data parameters.

In step S206, the originally received statement is stored for possible future recollection. The reason for this step will become apparent in due course. In step S208, the received SQL statement is amended so as to substitute parameter markers for the SQL literals. The resulting amended SQL statement (1') is as follows:

SELECT NAME FROM EMPLOYEES WHERE
  JOB_LEVEL=CAST(? AS VARCHAR(2000))
  AND SALARY>CAST(? AS DOUBLE) AND
  YEARS_OF_SERVICE>CAST (? AS INT)        (1')

In the present example, each parameter marker is cast to the data type of the substituted SQL literal. Because SQL is a strongly typed language, an error may be thrown at the RDBMS 14 in the event of a type mismatch between the searched variable (i.e. the variable left of the equals sign) and the literal. Typecasting may reduce the likelihood of such errors. Of course, it will be appreciated that typecasting is not required. For example, typecasting may be omitted in an alternative embodiment employing a database query language other than SQL which is not strongly typed, or in the event that the risk of errors from type mismatches is known to be low or tolerable in the circumstances. The substituted SQL literals are stored for use as parameters (step S210).

In step S212, the amended SQL statement is flagged to indicate that the SQL literal substitution has been made. It will be appreciated that, in the present embodiment, this flagging step does not entail any actual modification of the SQL statement. Rather, an internal flag suitable for passing from the client device 20 or 30 to the server 12 according to the operative client/server protocol is set to indicate SQL literal substitution. The pre-processing of SQL statement (1) is thus completed.

Turning to FIGS. 3 and 4, the pre-processed statement (1') is executed in steps 300 and 400 with the steps 300 representing processing occurring at the client RDBMS run-time component 26 of client device 20 or 30 and steps 400 occurring at the RDBMS 14 of server 12.

In initial step S302 (FIG. 3), the amended SQL statement (1') is submitted to the RDBMS 14 by the client run-time RDBMS component 26 along with the three parameters comprising the substituted SQL literals indicated below:

Parameter 1: "ENGINEER"
Parameter 2: 100000.0
Parameter 3: 5

Referring to FIG. 4, the statement (1') and parameters are received by the RDBMS 14 in step S402. It will be appreciated that steps S302 and S402 entail intercommunication between the client run-time RDBMS component 26 and the RDBMS 14 which, in the present embodiment, occurs across data network 18 using the operative client/server protocol.

In step S404, the RDBMS 14 checks whether the received SQL statement (1') has been flagged to indicate that at least one SQL literal substitution has occurred. In the event that the statement has not been flagged, as would be the case for statements that did not originally include an SQL statement and were therefore not amended during pre-processing, the statement is submitted to the query optimizer 32 (FIG. 1) in step S406 for access plan determination. In the present case, however, the flag does in fact indicate that at least one SQL literal substitution has occurred. Accordingly, step S408 is executed next.

In step S408, an examination of the amended SQL statement (1') and the received parameters occurs to ascertain whether the substitution was sound. In the present embodiment, soundness is measured in terms of the semantic correctness of the amended statement and the likelihood that the SQL literal substitutions will improve RDBMS efficiency. What is sought to be detected (and avoided) in this step is a "dangerous" amended SQL statement which, when executed by the RDBMS 14, may in fact be semantically incorrect or less efficient than the original SQL statement.

The soundness examination of the present embodiment includes two tests: a "trailing wildcard test" and an "overloaded function parameter test". It will be understood that alternative embodiments may employ only one or the other of these tests, alone or in conjunction with other tests, to establish soundness; or an alternative test or tests may be employed.

The "trailing wildcard test" is a determination of whether the replaced literal includes a trailing wildcard character. In conventional RDBMS processing of an SQL literal with a trailing wildcard character, rows which do not match the hard-coded prefix of the SQL literal can be "filtered away" during execution, thus reducing the amount of data that must be searched. For example, consider the following exemplary "dangerous" SQL statement, which includes an SQL literal ("A %") with a trailing wildcard character ("%"):

SELECT NAME FROM EMPLOYEES WHERE
    FIRSTNAME="A %"    (2)

In conventional RDBMS processing, any rows in the employees table in which the value of the FIRSTNAME column does not have the requisite prefix "A" may be filtered away to promote searching efficiency. When the SQL literal "A %" is replaced with a parameter marker, however, no such filtering can occur. Accordingly, the execution of this statement (2) will likely be more efficient than the execution of a corresponding amended SQL statement in which the SQL literal has been replaced with a parameter marker.

The "overloaded function parameter test" is used in object oriented programming environments to ascertain whether the substituted SQL literal comprises a parameter to a function with an overloaded function name. In such cases, it is usually preferable for the RDBMS 14 to process the original SQL statement in order to ensure that the results are semantically correct. Failure to do so may cause an access plan to be erroneously reused.

For example, consider the following two SQL statements (3a) and (3b):

VALUES(INVERSE(5.0))    (3a)

VALUES(INVERSE("RED"))    (3b)

Each of the statements (3a) and (3b) includes an invocation of a function named "INVERSE." In actuality, however, two separate functions are represented. The function of statement (3a) returns a numerical result representative of the reciprocal of the input parameter value (e.g. 0.2). The function of statement (3b), on the other hand, returns a string representative of a color that is the opposite of the color represented by the input parameter in the color spectrum (e.g., "GREEN"). In accordance with conventional object oriented function resolution techniques, the proper determination of which version of the overloaded function "INVERSE" is to be executed is properly made on the basis of the input parameter type.

If the SQL literals 5.0 and "RED" of statements (3a) and (3b) were to be replaced with parameter markers in the above described manner (assuming no typecasting), the amended version of each statement would be the same:

X=INVERSE(?)    (3')

However, any reuse of the access plan computed for one of the statements (3a) or (3b) during the execution of the other statement (3b) or (3a) would be semantically incorrect, as each statement should entail different processing (i.e. computation of a reciprocal versus "color inversion"). For this reason, substitution of SQL literals that are parameters to overloaded functions is considered to be unsound.

It is of course possible to typecast the parameter marker in an attempt to avoid semantically incorrect results. Such an approach may result in the generation of two different amended statements (3a') and (3b') rather than one common statement (3'), e.g.:

VALUES(INVERSE CAST(? AS DOUBLE))    (3a')

VALUES(INVERSE CAST(? AS VARCHAR
    (2000)))    (3b')

Because these statements are not functionally equivalent as determined by a textual comparison, no attempt would be made to reuse one of the statements' access plans during optimization of the other, and a semantic error may thereby be prevented. It should of course be appreciated that unsound substitutions can still occur even with such typecasting, due to limitations which may exist at the client with respect to the proper determination of parameter types. Such limitations may be reduced or eliminated, however, in embodiments where the substitution is performed at the DBMS rather than at the client, due to better function parameter type information available at the DBMS.

Referring back to FIG. 4, in the event that either the wildcard test or the overloaded function test indicates (in steps S408 and S410) that SQL literal substitution is unsound, an appropriate warning is issued to the client run-time RDBMS component 26 in step S412. This may entail the transmission of a "warning" message with a predetermined format from the server 12 to the client device 20 or 30 in accordance with the operative client/server protocol for example. The warning would be detected at the client device 20 or 30 in step S304 (FIG. 3); in response, the client device submits the original version of the SQL statement saved in step S206 (FIG. 2) to the RDBMS 14 in step S306 for processing in lieu of the amended statement. Appreciably, the issuance of a warning message and subsequent resubmission of the SQL statement in its original form are transparent to the client application 24.

In the present case, however, it is determined in steps S408 and S410 that the substitution of SQL literals in statement (1') is sound as both the "trailing wildcard test" and the "overloaded function parameter test" are met. Accordingly, the amended SQL statement (1') is submitted to the query optimizer 32 for optimization.

During optimization, the query optimizer 32, in a conventional manner, checks the SQL statement cache 30 to determine whether the newly received SQL statement is functionally equivalent to a previously received statement in order to ascertain whether a previously computed access plan may be reused. In the present case, since the statement (1') has not previously been received, the optimizer computes a new access plan for the statement, which for convenience is referenced herein as "access plan AP1". The query optimizer 32 then stores both the statement (1') and the access plan AP1 in the SQL statement cache in a conventional manner.

Following optimization, the RDBMS 14 executes the access plan AP1 and returns the employee data retrieved from the relational database 16 to the client device 20 or 30, where it is used by the client application 24 in accordance with its objective.

To illustrate the advantage of the present embodiment, it is now assumed that a subsequent SQL statement differing from the first SQL statement (1) only in the value of its SQL literals is received.

More specifically, in a subsequent API call from within client application 24 at a client device 20 or 30, the following SQL statement (4) is received by the client RDBMS run-time component 26 (in step S202):

SELECT NAME FROM EMPLOYEES WHERE
    JOB_LEVEL="MANAGER" AND SAL-
    ARY>140000.0 AND YEARS_OF_SER-
    VICE>10                                              (4)

This SQL statement represents another search within the employees database, with somewhat different search criteria. Upon being received, the statement (4) is processed in steps 200 described above in order to effect the substitution of parameter markers for any SQL literals. This processing yields the following amended SQL statement and extracted parameters:

SELECT NAME FROM EMPLOYEES WHERE
    JOB_LEVEL=CAST(? AS VARCHAR(2000))
    AND SALARY>CAST(? AS DOUBLE) AND
    YEARS_OF_SERVICE>CAST (? AS INT)                     (4')

Parameter 1: "MANAGER"
Parameter 2: 140000.0
Parameter 3: 10

It will be appreciated that the amended SQL statement (4') is identical to the amended SQL statement (1'). Only the values of the three parameters to be passed in conjunction with the statements are different.

When the statement (4') is subsequently optimized by the RDBMS 14 at step S406 (FIG. 4), it is compared with the statements stored in the SQL statement cache 32 as described previously. In this case, however, the comparison will yield a match between the amended statement (4') and the cached SQL statement (1'). This match allows the cached access plan AP1 to be reused by the optimizer. Advantageously, the computation of a new access plan, as would have been necessary without the SQL literal substitution, is not performed, and the efficiency of the RDBMS 14 may be improved as a result of the reuse of access plan AP1.

Ultimately, the magnitude of any efficiency improvements in the operation of the RDBMS 14 which may occur as a result of the SQL literal substitution technique described herein are dependent on the actual SQL statements that are executed. Efficiency gains may be greatest in cases where many SQL statements, differing only the value of their SQL literals, are processed (e.g. as may occur with a networked RDBMS processing queries from multiple remote clients executing the same application).

As will be appreciated by those skilled in the art, modifications to the above-described embodiment can be made without departing from the essence of the invention. For example, it is not necessary for the client application 24 and client run-time RDBMS component 26 to execute on a client computing device 20 or 30 separate from the server 12. These components may be executed on the same physical computing device as the RDBMS 14 in alternative "standalone" embodiments. Putting it another way, the steps 200 and 300 may occur on the same physical device as the steps 400. It may be possible to employ the same client run-time RDBMS component 26 as is employed in the above-described embodiment in view of the fact that such components 26 may be capable of interacting with either a local RDBMS or a remote RDBMS. Such embodiments may not require a data network 18.

Even given separate server-side and client-side RDBMS components, the system could be modified so that it is the server-side component which parameterizes statements.

In another alternative, testing for the soundness of parameterized statements may be omitted. Omission of these steps may be desirable, for example, to further enhance efficiency in cases where it is known that the SQL statements to be processed are not likely to result in unsound substitutions (e.g. when typecasting of substituted parameters is known to be accurately performed so as to avoid problems with overloaded function names). It should be appreciated, however, that if the nature of the SQL statements to be processed is not known, some risk of performance degradation due to unsound substitutions may be introduced by this omission.

Fundamentally, the DBMS need not be relational. Rather, any other form of DBMS may be employed which has a database query language statement cache and which reuses cached access plans in the event that statements which are functionally equivalent to previously received statements are received.

As well, it should be appreciated that the operative database query language need not be SQL. Rather, any other database query language may be used, provided that it employs literals and parameter markers which may be substituted therefor (or equivalent constructs, regardless of their names).

Other modifications will be apparent to those skilled in the art and, therefore, the invention is defined in the claims.

What is claimed is:

1. A computer-implemented method for promoting reuse of previously generated access plans by a database management system (DBMS), wherein the previously generated access plans correspond with previously processed database query language statements, the method comprising:

receiving a database query language statement, wherein said database query language statement is Structured Query Language (SQL);

amending said database query language statement with a parameter marker substituted for a literal, wherein said parameter marker has a same data type as said literal, wherein the received database query language statement and the amended database query language statement differ only in a value of one or more literals, wherein the amended database query language statement is a functional equivalent to a previously processed database query language statement thereby allowing a reuse of a previously generated access plan;

providing a substitution indicator to said DBMS indicating that substitution of said parameter marker for said literal has been performed, wherein said substitution indicator includes a flag passed to said DBMS using a client/server protocol;

determining soundness of the substitution that is performed, wherein soundness is measured in terms of semantic correctness of the amended query language statement and the likelihood that the literal will improve DBMS efficiency, wherein the assessing comprises a trailing wildcard test and an overloaded function parameter test, wherein the trailing wildcard test determines if the substituted parameter marker includes a trailing wildcard character, wherein the trailing wildcard character is indicated by rows that do not match a hard-coded prefix of the literal, wherein the overloaded function parameter test determines if the substituted parameter marker includes a parameter to a function with an overloaded function name;

providing an original database query language statement to said DBMS for access plan selection when an indication from said DBMS that said substitution was unsound is received; and providing said amended database query language statement and the parameter comprising the substituted literal to said DBMS for access plan selection; and selecting for reuse the previously generated access plan corresponding to the previously processed database query language statement functionally equivalent to said amended database query language statement.

2. A computer-implemented method for promoting the reuse of previously generated access plans by a database management system (DBMS), wherein the previously generated access plans correspond with previously processed database query language statements, the method comprising:
receiving an amended database query language statement with a parameter marker substituted for a literal, wherein said parameter marker has a same data type as said literal, wherein the received database query language statement and the amended database query language statement differ only in a value of one or more literals, wherein said amended database query language statement is a functional equivalent to a previously processed database query language statement thereby allowing a reuse of a previously generated access plan, wherein said database query language statement is Structured Query Language (SQL);
receiving a substitution indicator indicating that substitution of said parameter marker for said literal has been performed, wherein said substitution indicator includes a flag passed using a client/server protocol;
determining soundness of the substitution that is performed, wherein soundness is measured in terms of semantic correctness of the amended query language statement and the likelihood that the literal will improve DBMS efficiency, wherein the assessing comprises a trailing wildcard test and an overloaded function parameter test, wherein the trailing wildcard test determines if the substituted parameter marker includes a trailing wildcard character, wherein the trailing wildcard character is indicated by rows that do not match a hard-coded prefix of the literal, wherein the overloaded function parameter test determines if the substituted parameter marker includes a parameter to a function with an overloaded function name;
receiving an original database query language statement for access plan selection when an indication that said substitution was unsound is received;
wherein if the determining step indicates an unsound substitution:
receiving an original database query language statement in which no parameter marker has been substituted for a literal; and
selecting a previously generated access plan corresponding to a previously processed database query language statement functionally equivalent to said original database query language statement;
receiving the parameter including said substituted literal; and
selecting for reuse the previously generated access plan corresponding to the previously processed database query language statement functionally equivalent to said amended database query language statement.

3. A computer program product comprising a computer readable medium carrying program means for promoting reuse of previously generated access plans by a database management system (DBMS), wherein the previously generated access plans correspond with previously processed database query language statements, the computer program product comprising:
code means for receiving a database query language statement, wherein said database query language statement is Structured Query Language (SQL);
code means for amending said database query language statement with a parameter marker substituted for a literal, wherein said parameter marker has a same data type as said literal, wherein the received database query language statement and the amended database query language statement differ only in a value of one or more literals, wherein said amended database query language statement is a functional equivalent to a previously processed database query language statement thereby allowing a reuse of a previously generated access plan;
code means for providing a substitution indicator to said DBMS indicating that substitution of said parameter marker for said literal has been performed, wherein said substitution indicator includes a flag passed to said DBMS using a client/server protocol; and
code means for determining soundness of the substitution that is performed, wherein soundness is measured in terms of semantic correctness of the amended query language statement and the likelihood that the literal will improve DBMS efficiency, wherein the assessing comprises a trailing wildcard test and an overloaded function parameter test, wherein the trailing wildcard test determines if the substituted parameter marker includes a trailing wildcard character, wherein the trailing wildcard character is indicated by rows that do not match a hard-coded prefix of the literal, wherein the overloaded function parameter test determines if the substituted parameter marker includes a parameter to a function with an overloaded function name;
code means for providing an original database query language statement to said DBMS for access plan selection when an indication from said DBMS that said substitution was unsound is received;
code means for providing an original database query language statement to said DBMS for access plan selection, upon receipt of the indication from said DBMS that said substitution was unsound;
code means for providing said amended database query language statement and the parameter comprising the substituted literal to said DBMS for access plan selection; and
code means for selecting for reuse the previously generated access plan corresponding to the previously processed database query language statement functionally equivalent to said amended database query language statement.

4. A computing device for promoting reuse of previously generated access plans by a DBMS, wherein the previously generated access plans correspond with previously processed database query language statements, said device comprising a processor and persistent storage memory in communication with said processor storing processor readable instructions adapting said device to:
receive a database query language statement, wherein said database query language statement is Structured Query Language (SOL);
amend said database query language statement with a parameter marker substituted for a literal, wherein said parameter marker has a same data type as said literal wherein the received database query language statement and the amended database query language statement differ only in a value of one or more literals, wherein said amended database query language statement is a functional equivalent to a previously processed database query language statement thereby allowing a reuse of a previously generated access plan;
determine soundness of the substitution that is performed, wherein soundness is measured in terms of semantic correctness of the amended query language statement and the likelihood that the literal will improve DBMS efficiency, wherein the assessing comprises a trailing wildcard test and an overloaded function parameter test, wherein the trailing wildcard test determines if the substituted parameter marker includes a trailing wildcard character, wherein the trailing wildcard character is indicated by rows that do not match a hard-coded prefix of the literal, wherein the overloaded function parameter test determines if the substituted parameter marker includes a parameter to a function with an overloaded function name;

provide a substitution indicator to said DBMS indicating that substitution of said parameter marker for said literal has been performed, wherein said substitution indicator includes a flag passed to said DBMS using a client/server protocol;

provide an original database query language statement to said DBMS for access plan selection when an indication from said DBMS that said substitution was unsound is received providing an original database query language statement to said DBMS for access plan selection, upon receipt of the indication from said DBMS that said substitution was unsound;

providing said amended database query language statement and the parameter comprising the substituted literal to said DBMS for access plan selection; and select for reuse the previously generated access plan corresponding to the previously processed database query language statement functionally equivalent to said amended database query language statement.

5. A computing device for promoting reuse of previously generated access plans by a DBMS, said device comprising a processor and persistent storage memory in communication with said processor storing processor readable instructions adapting said device to:

receive an amended database query language statement with a parameter marker substituted for a literal, wherein said parameter marker has a same data type as said literal, wherein the received database query language statement and the amended database query language statement differ only in a value of one or more literals, wherein said amended database query language statement is a functional equivalent to a previously processed database query language statement thereby allowing a reuse of a previously generated access plan, wherein said database query language statement is Structured Query Language (SQL);

determine soundness of the substitution that is performed, wherein soundness is measured in terms of semantic correctness of the amended query language statement and the likelihood that the literal will improve DBMS efficiency, wherein the assessing comprises a trailing wildcard test and an overloaded function parameter test, wherein the trailing wildcard test determines if the substituted parameter marker includes a trailing wildcard character, wherein the trailing wildcard character is indicated by rows that do not match a hard-coded prefix of the literal, wherein the overloaded function parameter test determines if the substituted parameter marker includes a parameter to a function with an overloaded function name;

receive a substitution indicator indicating that substitution of said parameter marker for said literal has been performed, wherein said substitution indicator includes a flag passed using a client/server protocol; and receive an original database query language statement for access plan selection when an indication that said substitution was unsound is received.

* * * * *